United States Patent Office 3,437,551
Patented Apr. 8, 1969

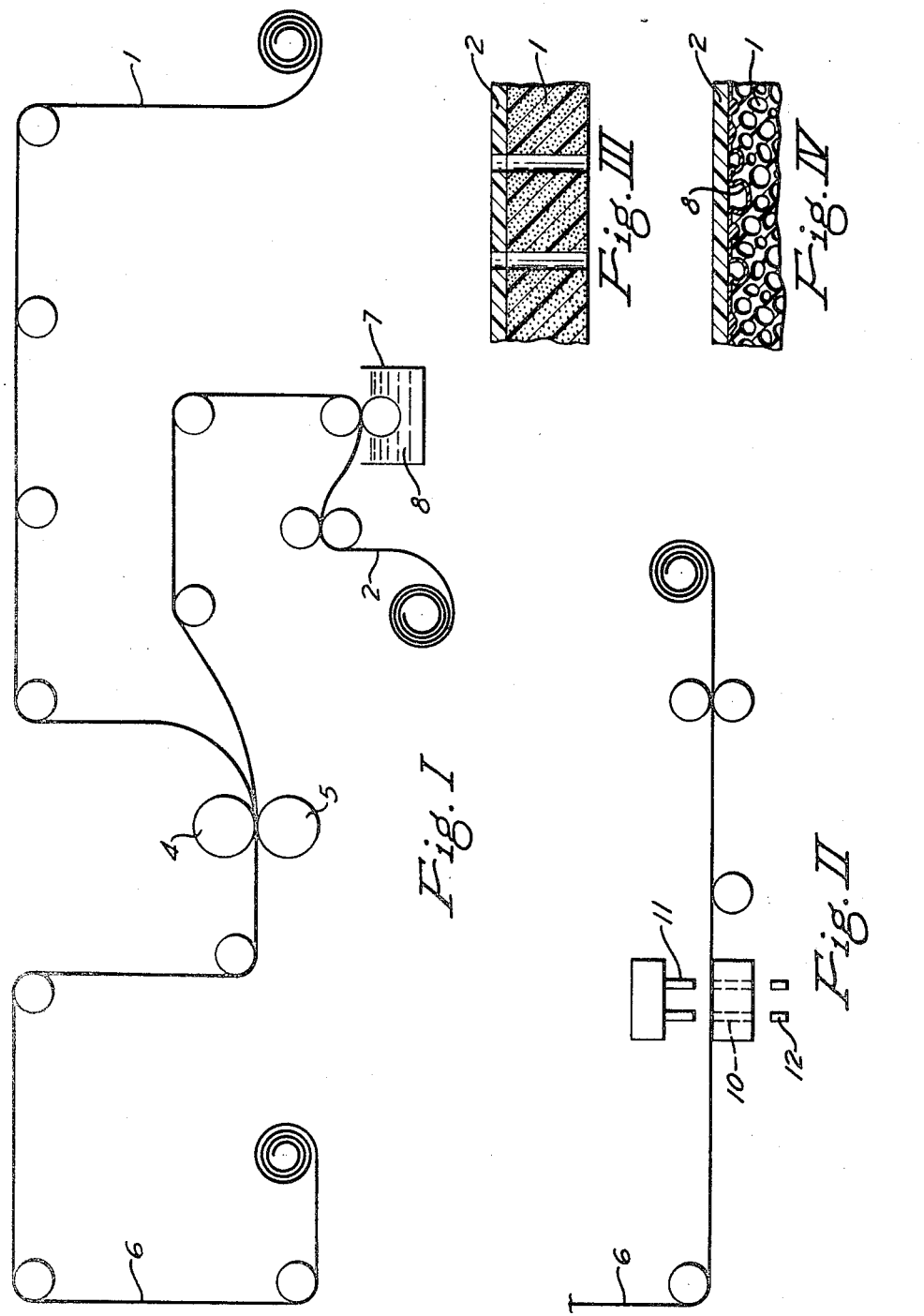

3,437,551
METHOD OF BONDING THERMOPLASTIC FILM
TO POLYURETHANE FOAM AND PRODUCT
Irving L. Marshack, La Jolla, Calif., assignor, by mesne
assignments, to Mobay Chemical Company, Pittsburgh,
Pa., a corporation of Delaware
Filed Sept. 15, 1964, Ser. No. 396,490
Int. Cl. B32b 5/18
U.S. Cl. 161—160     9 Claims

ABSTRACT OF THE DISCLOSURE

A self-sustaining thermoplastic resinous sheet is bound to the surface of a polyurethane foam by interposing between the two a plastisol containing a resin compatible with the sheet and heating and firmly pressing the resulting assembly.

---

This invention relates generally to a method for covering a polyurethane foam with a substantially non-porous synthetic resinous film and more particularly to a method for heat-sealing a self-sustaining thermoplastic film to the surface of a polyurethane foam.

Many attempts have been made in the past to cover a polyurethane foam with a thermoplastic film. The porous surface of the polyurethane foam is not amenable to sealing to a thermoplastic film, and much difficulty has been experienced in attempting to bind the film to the foam. It is suggested in U.S. 2,759,475 that such a film should be glued to a polyurethane foam, but no suitable glue is disclosed. It has also been proposed to form the foam in situ between layers of the thermoplastic film and thereby produce a satisfactory seal. This process is not entirely suitable for continuous production because of the difficulty in satisfactorily forming the foam between the two self-sustaining resinous films. Apparently because of such difficulties and because polyurethane foam is not amenable to conventional techniques for laminating resinous webs together, it has been proposed to coat the surface of the foam with a plastisol and cure the plastisol to form a coating on the foam. Such a process does not produce a surface which is satisfactory for many purposes, particularly where a decorative surface is required.

It has been disclosed in U.S. Patents 2,979,836 and 3,026,333 that a thermoplastic film can be heat-sealed to the surface of a polyurethane foam by pressing the assembly with a preheated electronic die while passing high frequency current through the die. This process is not suitable for making continuous webs of polyurethane foam having a substantial non-porous thermoplastic covering because the foam becomes sealed to the self-sustaining thermoplastic film only adjacent to the die surface.

It is, therefore, an object of this invention to provide a method for providing a polyurethane foam with an adherent covering of a thermoplastic film. Another object of the invention is to provide a novel method for heat-sealing a self-sustaining thermoplastic film to the surface of the polyurethane foam. Still another object of the invention is to provide a method for sealing continuous webs of thermoplastic film to the coextensive surface of a polyurethane foam. A more specific object of the invention is to provide a novel method for heat-sealing a self-sustaining thermoplastic film throughout the co-extensive surface of a polyurethane foam, which method is particularly advantageous for laminating continuous webs of such materials.

Other objects will become apparent from the following description with reference to the accompanying drawing in which:

FIGURE I illustrates an apparatus suitable for use in practicing one embodiment of this invention;

FIGURE II shows an apparatus particularly well suited for making an improved carpet underlay in cooperation with the apparatus of FIGURE I;

FIGURE III is a fragmentary section of an embodiment of a product of the invention; and FIGURE IV illustrates in an enlarged fragmentary section an embodiment of the invention during pressing and heating.

The foregoing objects and others are accomplished in accordance with this invention, generally speaking, by providing a method wherein a plastisol having a thermoplastic resin dispersed therein is interposed between a self-sustaining thermoplastic film and a polyurethane foam and the resulting assembly is heated to a temperature at which the resin in the plastisol is fused, but below the temperature at which substantial distortion of the self-sustaining thermoplastic film will occur, while pressing the thermoplastic film firmly against the surface of the polyurethane foam and thereafter cooling the resulting laminate below the fusion point of the resin interposed between the thermoplastic film and the polyurethane foam. In a preferred embodiment of this invention, a continuous web of thermoplastic film is coated with plastisol, assembled with a web of polyurethane foam with the plastisol interposed between co-extensive surfaces of the thermoplastic film and polyurethane foam, and this assembly is passed between the nip of a heated collander roll and a roll exerting pressure theragainst. The temperature and speed of the collander roll is controlled so that fusion of the resin in the plastisol occurs but no substantial distortion of the self-sustaining thermoplastic film takes place. The roll cooperating with the collander roll is provided with a means for varying its pressure against the collander roll in order that the laminate passing between the nip of the rolls is firmly pressed while the resin in the plastisol is in the fused state. This insures penetration of the pores in the surface of the foam by the fused resin, thereby providing a substantially continuous surface on the foam which is co-extensive with the surface of the thermoplastic film. When the assembly is cooled below the fusion point of the resin the thermoplastic film is securely bound to the surface of the foam. Immediately after passing from the nip between the pressure roll and heated collander roll, the assembly springs back to substantially the same thickness as it had when it entered the nip between the rolls.

In one embodiment of the invention, a carpet underlay is prepared by heat-sealing a continuous self-sustaining thermoplastic film to the surface of a continuous urethane foam web as described hereinbefore, cooling the resulting laminate, and then die-cutting a plurality of perforations in the continuous web. A small plug is removed from the laminate, thereby providing a perforation through the thickness of the laminate. It is essential in accordance with this invention that the laminate be plugged, as distinguished from mere perforation, by puncturing in order to insure proper functioning of the underlay when installed beneath a carpet.

The heated roll or collander roll can be heated by any convenient means, such as, for example, by pumping heated oil or other suitable liquid therethrough. Means should be provided for adjusting the pressure on the cooperating roll in order to control the amount of compression of the assembly as it passes through the nip between the rolls. The resulting laminate is preferably permitted to cool below the temperature of the roll and is then rolled for storage or can be used immediately.

The laminate produced in accordance with this invention can be shaped by heat-sealing methods into cushions or similar articles of upholstery or, as described in more details herein, as a carpet underlay.

Laminates of any polyurethane foam and any suitable thermoplastic synthetic resin can be prepared in accordance with this invention so that all such laminates are broadly contemplated. For example, the thermoplastic film can be polyvinyl chloride, polyamides, polypropylene, polyvinyl alcohol, polycarbonate, polyvinyl acetate, copolymers of polyvinyl chloride and polyvinyl acetate, polyurethane, and the like. In all instances, the thermoplastic film is a self-sustaining film and can vary in thickness. Preferably the thickness thereof is from about 2 to about 10 mils or, in other words, from about 0.002 to about 0.010 inch. The plastisol used to heat-seal the self-sustaining film to the surface of a polyurethane foam can contain any suitable synthetic resin which can be fused without substantaial distortion of the self-sustaining film and which is compatible therewith. For example, the plastisol or organsol can contain polyvinyl chloride, polyvinyl acetate, copolymers of polyvinyl chloride and polyvinyl acetate, polymethyl methacrylate, polymethyl acrylate, butadiene acrylonitrile copolymer, polyvinyl acetals, and the like dispersed therein. The plastisol should also contain a suitable plasticizer or mixture of plasticizers, such as, for example, dibutylphthalate, dioctylphthalate, diisodecylphthalate, diisooctylphthalate, a chlorinated biphenyl, or a petroleum distillate having a high distillation range.

One adhesive composition which has been found particularly advantageous for sealing a self-sustaining polyvinyl chloride film to a polyurethane foam has a viscosity of about 1300 cps. and is a plastisol having polyvinyl chloride which fuses at a temperature of about 250° to 300° F. dispersed in a plasticizer such as dioctylphthalate and a petroleum distillate having a distillation range from about 600° to about 700° F. The plastisol also contains an epoxidized oil and a metallic salt stabilizer such as barium laurate or a cadmium or zinc salt of a carboxylic acid. A mercaptide can also be used as a stabilizer. The viscosity during use will gradually increase and best results are obtained if it does not exceed about 6000 cps.

The polyurethane foam is preferably a flexible material which can be prepared by conventional methods, such as, for example, the method described in U.S. Patent Re. 24,514. The polyurethane foam can be a polyester-polyurethane foam, a polyether-polyurethane foam, or the like. Other suitable processes for making polyurethane foams which can be used in practicing this invention are found in the art, such as, for example, U.S. 3,054,757, 3,061,556, and 3,067,148. For best results the polyurethane foam should be either a polyester-polyurethane foam or a polyester-polyurethane foam, should have a compression deflection of from 20 to 40 pounds per fifty square inch of area at 25% deflection, and a density of from about 1 to about 8 pounds per cubic foot. Suitable polyether-polyurethane foams can be made by the processes described in U.S. Patents 2,948,691, 3,094,495, and 3,044,971.

In one preferred embodiment of the invention, a flexible polyether-polyurethane foam is used in combination with a self-sustaining polyvinyl chloride film which is adhesively bound to the foam by means of a polyvinyl chloride plastisol dispersion.

Referring now to the drawing, FIGURE 1 illustrates diagrammatically an apparatus suitable for practicing this invention. A continuous web of polyurethane foam 1 and a continuous self-sustaining polyvinyl chloride film 2 are provided. The film 2 is roller coated in container 7 with a plastisol dispersion of polyvinyl chloride 8. Webs 1 and 2 pass between rolls 4 and 5. Roll 5 is heated and roll 4 presses webs 1 and 2 firmly against the heated surface of roll 5, thereby insuring penetration of the pores on the surface of the foam by the plastisol. The temperature of roll 5 is such that the rsin in the plastisol fuses and cures and securely seals thermoplastic film 2 to the surface of the polyurethane foam web without substantial distortion of film 2. The laminate 6 is then passed over a plurality of idler rolls to permit cooling of the laminate before it is rolled for storage.

As illustrated in FIGURE II, laminate 6 may be passed between a perforating apparatus having a plurality of spaced punches 11 moved up and down through laminate 6 and into dies 10 cutting plugs 12 from the laminate. The resulting perforation in the laminate extends completely through film 2 and foam 1. Since a plug 12 of laminate 6 is removed, the resulting perforation does not close as soon as the punch 11 is withdrawn as it would if the foam were merely pierced.

The plastisol used in the foregoing embodiment described with reference to the drawing has the following composition, with the parts given by weight:

|  | Parts |
|---|---|
| Polyvinyl chloride, fusion points 250° to 300° F. | 100 |
| Dioctylphthalate | 50 |
| Petroleum distillate having a distillation of 600° to 675° F. | 20 |
| Epoxidized oil | 5 |
| Barium laurate | 3 |

It has been found most advantageous to use a resin in the plastisol of the same chemical composition as that of the self-sustaining thermoplastic film. However, the resin used in the plastisol is a lower polymer having a lower fusion point. During the heating process, this further polymerization occurs and the self-sustaining film becomes bound to the surface of the polyurethane foam. By providing the plastisol as an intermediate layer between the self-sustaining film and the polyurethane foam, substantially continuous coextensive resinous surfaces are available. As illustrated in FIGURE IV, the plastisol 8 coats the surface and is forced into the pores 9 of the foam 1 where it is cured by the heated roll. The resin in the pores 9 serves as anchors for the film formed from the plastisol and assists in the production of a laminate which resists pulling apart to a point where the foam is usually torn first. In order to insure proper adhesion, the assembly of foam, self-sustaining film, and plastisol should be pressed firmly against the heated surface. For best results, the amount of pressure should be sufficient to compress the assembly to not substantially more than about 25% of its original thickness. While it is preferred to use rollers of the type illustrated in the drawing, in combination with continuous webs, the process of the invention can also be practiced with other apparatus, such as heated platens or the like. It is important that the plastisol does not contain any substantial amount of volatile materials which will volatize during the heat-sealing process in order to avoid bubbling which will cause distortion of the resulting product.

The invention has been described in detail with respect to the lamination of a polyvinyl chloride film to a polyurethane foam, but it is to be understood that other self-sustaining thermoplastic films can be laminated to the foam in accordance with this invention and that it is only necessary to substitute one of the other self-sustaining films indicated as suitable herein for the polyvinyl chloride in the foregoing embodiment of the invention. As indicated hereinbefore, it is preferable but not absolutely necessary that the resin in the plastisol have the same general chemical composition as that of the self-sustaining thermoplastic film. In the event a different resin is to be used in the plastisol, it should be compatible to the resin forming the self-sustaining thermoplastic film and should have a fusion point below the distortion point of the self-sustaining film.

The temperature of the heated roll and the exposure time used to fuse and cure the resin in the plastisol and thereby heat-seal the self-sustaining film to the foam will vary with the resin and film used but will be such that the resin in the plastisol fuses during the exposure to the heated roll without substantial distortion of the self-sustaining film. With most plastisols and self-sustaining films, the temperature of the roll 5 will be from about 220° to about 350° F. The pressure used should be sufficient to reduce the thickness of the foam by at least about 75 percent and to insure proper wetting and penetration of the surface of the foam. A pressure of from about 25 to about 35 pounds per square inch will usually achieve this result. In the continuous apparatus of the drawing, the speed of the webs can be varied as long as the webs are adjacent the heated roll long enough to heat the plastisol to create a fusion of the resin dispersed therein.

It is believed that the exceptionally strong bond resulting from this process is at least partially due to the intimate relationship of the foam and plastisol during curing. The plastisol is pressed or squeezed into the pores of the foam as it is compressed, and as compression continues and the pores are at least partially closed, the plastisol becomes entrapped therein. Upon curing and solidification it serves as anchors extending into the pores on the surface of the foam.

Although the invention has been described in considerable detail for the purposes of illustrating the invention, it is to be understood that modifications can be made by those skilled in the art without departing from the scope and spirit of the invention except as it is limited by the claims.

The process of this invention is applicable to the coating of polyurethane foam having a profiled surface. The resulting coating is adhered to both the hills and valleys of the profiled surface. For example, a cross-section of a profiled surface of the foam would represent a typical sine wave pattern as distinguished from a straight line. In this instance, the thermoplastic film coating follows the contour of the hills and valleys of the profiled surface and is securely attached to the entire surface.

A carpet underlay which is particularly advantageous is provided with an open woven fabric layer between the foam and thermoplastic film coating. In making such a product in accordance with this invention, the fabric or scrim is interposed between the thermoplastic film and foam. This assembly is run between the nip of the rolls where the plastisol coated film is forced through the openings in the fabric and sealed to the surface of the foam. In order to insure the best seal, an open mesh fabric such as scrim should be used.

What is claimed is:

1. A method for heat-sealing a polyurethane foam to a self-sustaining thermoplastic film which comprises interposing substantially throughout coextensive surfaces of the foam and the film a coating of a plastisol having a resin compatible with the film and heating and firmly pressing the resulting assembly until the resin in the liquid plastisol coating is fused and some of the coating extends into at least some of the pores only adjacent the surface of the foam, while avoiding substantial distortion of the film, and thereafter cooling the fused resin below its solidification point while the said assembly is of substantially the same thickness as it was prior to the pressing, thereby sealing the film to the foam.

2. The product of the process of claim 1.

3. A method for binding a self-sustaining thermoplastic film to the surface of a polyurethane foam which comprises coating the thermoplastic film with a plastisol having dispersed therein a resin compatible with said film, assembling the coated film with a polyurethane foam with the plastisol interposed between coextensive surfaces thereof, passing the assembly over a heated roll while firmly pressing the assembly against the roll at a speed whereby the resin in the liquid plastisol is fused and forced into pores only adjacent the surface of the foam but the film is not substantially distorted and cooling it after the assembly has sprung back to substantially its thickness prior to pressing below the solidification point of the resin in the plastisol.

4. The process of claim 3 wherein the self-sustaining thermoplastic film is a self-sustaining polyvinyl chloride film and the resin in the plastisol is polyvinyl chloride.

5. The method of claim 3 wherein the said foam prior to pressing of the assembly has a profiled surface.

6. A method for laminating a self-sustaining thermoplastic film to a polyurethane foam which comprises coating a surface of a continuous web of said film with a plastisol having dispersed therein a resin, passing the coated web and a continuous web of polyurethane foam with said coating interposed between coextensive surfaces of the film and foam between a heated roll and a roll which presses the resulting assembly firmly against the heated roll and forces liquid plastisol into the pores only adjacent the surface of the foam, thereby fusing the resin in the plastisol, and after the resulting laminate has sprung back to its thickness prior to pressing cooling it below the fusion point of the said resin, whereby resin in the pores solidifies to form an adhesive layer having anchors secured in pores on the surface of the foam.

7. The process of claim 6 wherein said foam is a polyether-polyurethane foam, the self-sustaining film is a polyvinyl chloride film, and the said resin is polyvinyl chloride.

8. A method for laminating a self-sustaining thermoplastic film to a polyurethane foam which comprises coating a surface of said film with a plastisol having dispersed therein a resin compatible with said film, interposing the said coating between coextensive surfaces of said film nd said foam, pressing and heating the resulting sandwich to force liquid plastisol into pores only adjacent the surface of the foam and fuse the resin while avoiding distortion of the film, and after the sandwich has sprung back to its thickness prior to pressing, cooling the fused resin until it is solidified in the pores, thereby heat-sealing the said coextensive surfaces together.

9. A method for laminating a polyurethane foam and a self-sustaining thermoplastic film which comprises interposing therebetween a plastisol having a resin compatible with said film dispersed therein, pressing the resulting assembly to compress the foam, force liquid plastisol into pores only adjacent the surface of the foam, and at least partially close said pores; and fusing the resin dispersed in the plastisol while avoising distortion of the film, and after the assembly has sprung back substantially to its thickness prior to pressing, cooling the fused resin until solidified, thereby sealing the thermoplastic film to the foam.

References Cited

UNITED STATES PATENTS

| 3,002,868 | 10/1961 | Boivin | 161—160 XR |
| 3,061,460 | 10/1962 | Schickedanz | 117—98 |
| 3,222,237 | 12/1965 | McKelvy | 161—93 XR |
| 3,244,573 | 4/1966 | Raffaelli | 156—515 XR |
| 1,862,633 | 6/1932 | Ramsay | 156—253 |
| 3,070,476 | 12/1962 | Miller. | |
| 3,257,263 | 6/1966 | Miller | 161—161 XR |
| 3,264,166 | 8/1966 | Lowery. | |

FOREIGN PATENTS 821,537 10/1959 Great Britain.

ROBERT F. BURNETT, *Primary Examiner.*

ROGER H. CRISS, *Assistant Examiner.*

U.S. Cl. X.R.

156—253, 308; 161—112, 190